2,837,490

MIXTURES OF VINYL RESIN, AROMATIC ACID, AND ASBESTOS CONTAINING IRON OXIDE

Arthur C. Hecker, Richmond Hill, N. Y., assignor to Argus Chemical Laboratory, Inc., a corporation of New York No Drawing. Application January 8, 1954
Serial No. 403,072

10 Claims. (Cl. 260—23)

This invention relates to asbestos and polyvinyl chloride compositions and to stabilizers adapted for use therein.

Compositions of this type are particularly useful in connection with the manufacture of formed units. Examples of these are polyvinyl chloride floor tile. The invention will be first illustrated, therefore, by description in connection with such use.

The stabilizer which is at present in extensive use in vinyl resin floor tile is a lead salt.

These lead stabilizers have important disadvantages. They are cumulative poisons, subject to staining by materials containing sulfides including hydrogen sulfide of the atmosphere, and of high specific gravity which increases the cost per unit of volume.

Conventional stabilizers for vinyl chloride resin compositions such as barium, cadmium and zinc salts of higher fatty acids and the like, are ineffective in the presence of asbestos when the asbestos contains iron. With asbestos freed from iron, on the other hand, these stabilizers are satisfactory.

I have discovered that certain free organic acids are effective stabilizers for polyvinyl chloride resins including iron-containing asbestos compounded with the resin. This discovery is in conflict with the common understanding that neutral or basic stabilizers only are satisfactory for this purpose.

The acids which are useful for my purpose are principally derivatives of benzoic acid corresponding to the type formula

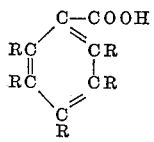

in which R represents a component selected from the group consisting of hydrogen, $C_1$–$C_5$ alkyls, hydroxyl, halogens, oxyacyl, oxyalkyl, ester, nitro and phenylene groups and at least 2 of the R's represent components selected from the group consisting of hydrogen and $C_1$–$C_5$ alkyls, or any combination of these substituents. When a bivalent substituent is used, it is bonded to two adjacent carbon atoms.

Specific examples of acids that are suitable for my purpose and that fit the type formula above are benzoic itself in which all the R's in the type formula represent hydrogen, o-, m- and p-hydroxy benzoic, monomethoxy-benzoic such as anisic, monethoxy benzoic, acetylsalicylic, any toluic acid, monoamylbenzoic, dichlorosalicylic, p-nitrobenzoic, mono-, di-, and trichlorobenzoic, monomethyl ester of phthalic, isophthalic and tetraphthalic acid and beta-oxynaphthoic acid.

The use of acids of this class, particularly those such as benzoic or salicylic acid that are available at the most satisfactory price, involves a considerable difficulty. This is the tendency of the free acids to sublime or evaporate. This volatilization results in fumes that are objectionable to the operator.

I have now discovered how to avoid these disadvantages and obtain the benefit of the acids as stabilizers without the need of special equipment for fume withdrawal. For this objective, I use salts of those acids or part of the free acids. The salts selected are those that, in contact with hydrogen chloride generated in the polyvinyl chloride resin because of the instability of the resin, liberate the free acids in amounts and at the times required to stabilize the vinyl resin. Examples of salts that meet these requirements are the salts of these acids with barium, strontium, calcium, magnesium, and zinc.

My stabilizers either free or fixed are effective when the polyvinyl chloride composition contains at least 25% by weight of iron-containing asbestos on the weight of the resin. When the iron-containing asbestos is absent or much lower in proportion than stated, they are not satisfactory at the high temperature of processing of the vinyl resin and asbestos composition required for the high speed compounding of present American practice.

My invention comprises, therefore, polyvinyl chloride resin and iron-containing asbestos compositions compounded with a stabilizer therefor, the stabilizer including an acid of the kind described, either in the free condition from the start or in form to appear in free condition when the compound containing it is contacted with hydrogen chloride.

As to materials used other than the acid, the asbestos is the usual commercial variety containing iron, as, for instance, chrysotile asbestos that has not been acid washed or otherwise treated to remove its original iron content. Representative asbestos contains 0.5–3% of iron calculated as oxide.

The vinyl chloride resin is one of the class including polyvinyl chloride itself, its copolymers with vinyl acetate or styrene and the corresponding vinylidene chloride polymer and copolymers.

A higher fatty acid containing 8–18 carbon atoms to the molecule may be incorporated, to give better stabilization, when the stabilizing acid of kind described is present largely or entirely in the form of the salt. Examples are 2-ethyl hexoic, lauric, myristic, palmitic, stearic, and coconut oil fatty acids.

For the purpose of stability only, the metal used in the form of the salts with the organic acids may be omitted. It was a complete surprise to discover that my acidic materials are effective in the acidic condition in polyvinyl chloride resin compositions containing the asbestos. The metal in amount to neutralize part of the acids present decreases volatility of the acids.

When no free acid is used in our composition and the acid or acids are present entirely in the form of the salt, then I obtain best results by using a special plasticizer to replace a part of other plasticizer materials. Under such conditions, I obtain the most satisfactory results from the use of a substantial proportion of an epoxy plasticizer. Examples of such epoxy plasticizers that meet the general requirements, illustrate the class to be used, and that are used by me are the hexyl ester of epoxystearic acid, the corresponding octyl ester, and epoxidized soyabean oil. When my benzoic type acid is present in free condition, then I use one of the commercial plasticizers, as, for example, dioctyl phthalate, tricresyl phosphate and glycol dibenzoate.

Usual solvents may be used in thinning the composition or components thereof.

Suitable proportions are plasticizer 50–100 parts and stabilizer 2–20 parts for 100 parts of the resin.

The higher fatty acid, when used, is ordinarily within the range 10%–50% of the actual stabilizer composition including the combined weight of the benzoic acid type compound and the fatty acid.

It will be understood that the asbestos and polyvinyl chloride resin compositions may and suitably do contain usual filler materials in proportions that are common in the industry of floor tile and the like. Thus, the compositions may contain 50–200 parts of finely divided filler materials such as calcium carbonate, clay, and diatomaceous earth for 100 of the resin. The proportion of asbestos may correspond to 25–200 parts or so for 100 of the resin.

When the epoxidized ester is used, a suitable proportion of it is 10–30 parts for 100 parts of the total plasticizer composition.

The invention will be further illustrated by detailed description in connection with the following specific examples of the practice of it. In these examples and elsewhere herein proportions are expressed as parts by weight.

*Example 1*

A floor tile was made of the following composition:

| | |
|---|---|
| Polyvinyl chloride (Exon 402A) | 50 |
| Asbestos, chrysotile (iron-containing) | 75 |
| Dioctyl phthalate | 50 |
| Finely divided calcium carbonate | 75 |
| Benzoic acid (stabilizer) | 6 |
| Pigments as desired. | |

These ingredients were compounded at elevated temperature in a usual type of mixer for such plastic compositions at usual temperature, that is, on calender rolls at a temperature of about 350° F. until the mix was substantially uniform. The product so made was then sheeted and sized for commercial use, in this case, into floor tile.

The floor tile so made was initially of a grey color. When heated to 350° F. for 2 hours, there was no substantial darkening or other change of color of the tile.

In the procedure of this example, there may be substituted any one of the vinyl chloride polymers and copolymers referred to earlier herein. Also there may be substituted for the dioctyl phthalate any common plasticizer for polyvinyl chloride resins, as, for instance, tricresyl phosphate, butyl benzyl phthalate, or diethylene glycol dibenzoate.

The substitutions when made are on an equal weight basis.

*Example 2*

Floor tile was made as described in Example 1 from materials compounded in the following proportions.

| Ingredient: | Parts |
|---|---|
| Vinyl chloride and acetate copolymer (Vinylite VYHH) | 60 |
| Butyl benzyl phthalate | 30 |
| Iron-containing asbestos | 100 |
| Calcium carbonate (filler) | 50 |
| Barium acetylsalicylate | 5 |

The product made as described darkened to a limited extent only after being heated for 30 minutes at 350° F.

*Example 3*

The procedure and formula of Example 2 were followed with the inclusion of 3 parts of lauric acid.

The product of this example showed some darkening after 60 minutes heating at 350° F.

*Example 4*

The procedure of Example 3 is followed except that the 30 parts of butyl benzyl phthalate are reduced to 20 parts and 10 parts of G62 (epoxidized soya bean oil) is included in the plasticizer component.

The product does not darken in 2 hours at 350° F.

*Example 5*

The procedure of Examples 1–4 above is followed except that there is substituted, for the benzoic acid of Example 1 and for the acetylsalicylate of Examples 2, 3 and 4, any of the other acids disclosed herein as alternative materials for the benzoic and the acetylsalicylic acids.

*Example 6*

The procedure of Examples 2–5 is followed with the substitution of the barium as the metal therein by magnesium, calcium, strontium, and the substitution being on the basis of equivalent weights of the metals. In the compositions containing a higher fatty acid, as in Examples 3 and 4, the proportion of the metal is less than that required to convert all of the acids present to the form of their salts.

All of the compositions show stabilization when tested at the temperature of 350° F. provided the asbestos present contains iron in about the proportion which is normally present in commercial asbestos that has not been processed to remove iron.

It will be understood that it is intended to cover all changes and modifications of the examples of the invention herein chosen for the purpose of illustration which do not constitute departures from the spirit and scope of the invention.

What I claim is:

1. A composition of matter comprising asbestos containing iron oxide, a resin component selected from the group consisting of vinyl chloride resins and vinylidene chloride resins, and a stabilizer therefor, the proportion of the asbestos being 25–200 parts by weight for 100 of the polyvinyl chloride resin and the stabilizer consisting essentially of the iron oxide of the asbestos in contact with a free acid of the type formula

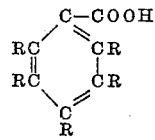

in which R represents a component selected from the group consisting of hydrogen, $C_1$–$C_5$ alkyls, hydroxyl, halogens, oxyacyl, oxyalkyl, ester, nitro and phenylene groups and at least 2 of the R's represent components selected from the group consisting of hydrogen and $C_1$–$C_5$ alkyls.

2. The composition of claim 1 in which a part of the said acid is in the form of a hydrogen-chloride-decomposable salt of a metal selected from the group consisting of the alkaline earth metals and zinc.

3. The composition of claim 2 which includes an admixed higher $C_8$–$C_{18}$ fatty acid.

4. A composition of matter comprising asbestos containing iron oxide, a resin component selected from the group consisting of vinyl chloride resins and vinylidene chloride resins, and benzoic acid, the iron oxide in contact with the benzoic acid serving as stabilizer for the said composition and the proportion of the asbestos being 25–200 parts by weight for 100 of the polyvinyl chloride resin.

5. A composition of matter comprising asbestos containing iron oxide, a polyvinyl chloride resin, and salicylic acid, the iron oxide in contact with the salicylic acid serving as stabilizer for the said composition and the proportion of the asbestos being 25–200 parts by weight for 100 of the polyvinyl chloride resin.

6. A composition of matter comprising asbestos containing iron oxide, a polyvinyl chloride resin, and a chloro-benzoic acid, the iron oxide in contact with the said acid serving as stabilizer for the said composition and the proportion of the asbestos being 25–200 parts by weight for 100 of the polyvinyl chloride resin.

7. A composition of matter comprising asbestos containing iron oxide, a polyvinyl chloride resin, and a stabilizer therefor, the proportion of the asbestos being 25–200 parts by weight for 100 of the polyvinyl chloride resin and the stabilizer therefor comprising salicylic acid, in the form of a salt thereof with a metal selected from the group consisting of the alkaline earth metals and zinc, and free higher $C_8$–$C_{18}$ fatty acid.

8. A composition of matter comprising asbestos containing iron oxide, a polyvinyl chloride resin, and a stabilizer therefor, the proportion of the asbestos being at 25–200 parts by weight for 100 of the polyvinyl chloride resin and the stabilizer therefor comprising chloro-benzoic acid, in the form of a salt thereof with a metal selected from the group consisting of the alkaline earth metals and zinc, and free higher $C_8$–$C_{18}$ fatty acid.

9. A composition of matter comprising asbestos containing iron oxide, a polyvinyl chloride resin, and a stabilizer therefor, the proportion of the asbestos being 25–200 parts by weight for 100 of the polyvinyl chloride resin and the stabilizer therefor comprising magnesium benzoate and a free higher $C_8$–$C_{18}$ fatty acid.

10. A composition of matter comprising asbestos containing iron oxide, a polyvinyl chloride resin, and a stabilizer therefor, the proportion of the asbestos being 25–200 parts by weight for 100 of the polyvinyl chloride resin and the stabilizer therefor comprising benzoic acid, in the form of a salt thereof with a metal selected from the group consisting of the alkaline earth metals and zinc, and free higher $C_8$–$C_{18}$ fatty acid.

References Cited in the file of this patent

UNITED STATES PATENTS

| | | |
|---|---|---|
| 2,389,460 | Rinehart | Nov. 20, 1945 |
| 2,598,496 | Bradley et al. | May 27, 1952 |
| 2,671,064 | Cowell et al. | Mar. 2, 1954 |
| 2,715,615 | De Bell et al. | Aug. 16, 1955 |

UNITED STATES PATENT OFFICE
CERTIFICATE OF CORRECTION

Patent No. 2,837,490                  June 3, 1958

Arthur C. Hecker

It is hereby certified that error appears in the printed specification of the above numbered patent requiring correction and that the said Letters Patent should read as corrected below.

Column 1, line 67, for "tetraphthalic" read --terephthalic--; column 4, line 9, after the word "and" insert --zinc,--.

Signed and sealed this 29th day of July 1958.

(SEAL)
Attest:

KARL H. AXLINE
Attesting Officer

ROBERT C. WATSON
Commissioner of Patents